US008930451B2

(12) United States Patent
Gu et al.

(10) Patent No.: US 8,930,451 B2
(45) Date of Patent: Jan. 6, 2015

(54) MULTICAST/UNICAST ADMISSION CONTROL METHOD, DEVICE AND SYSTEM (75) Inventors: Huailong Gu, Shenzhen (CN); Jun Li, Shenzhen (CN); Ting Zou, Shenzhen (CN); Zhenzhu Lv, Shenzhen (CN); Xiaolian Zhang, Shenzhen (CN)

(73) Assignee: Huawei Technology Co., Ltd., Shenzhen (CN)

( * ) Notice: Subject to any disclaimer, the term of this patent is extended or adjusted under 35 U.S.C. 154(b) by 615 days.

(21) Appl. No.: 12/685,373

(22) Filed: Jan. 11, 2010

(65) Prior Publication Data
US 2010/0115099 A1 May 6, 2010

Related U.S. Application Data (63) Continuation of application No. PCT/CN2008/072094, filed on Aug. 21, 2008.

(30) Foreign Application Priority Data

Aug. 24, 2007 (CN) .......................... 2007 1 0145177

(51) Int. Cl.
*G06F 15/16* (2006.01)
*H04L 12/18* (2006.01)
*H04L 12/54* (2013.01)
*H04L 12/911* (2013.01)
*H04L 12/927* (2013.01)

(52) U.S. Cl.
CPC ........ *H04L 12/1881* (2013.01); *H04L 12/5695* (2013.01); *H04L 47/782* (2013.01); *H04L 47/806* (2013.01)
USPC ............ 709/204; 709/227; 709/229; 709/223

(58) Field of Classification Search
None
See application file for complete search history.

(56) References Cited

U.S. PATENT DOCUMENTS

| | | | | |
|---|---|---|---|---|
| 6,119,163 A * | 9/2000 | Monteiro et al. | ............. | 709/227 |
| 6,718,387 B1 * | 4/2004 | Gupta et al. | .................. | 709/226 |
| 6,826,612 B1 * | 11/2004 | Bosloy et al. | ................. | 709/227 |
| 6,847,827 B2 * | 1/2005 | Helm et al. | .................... | 455/509 |
| 7,245,614 B1 * | 7/2007 | Podar et al. | ................... | 370/389 |
| 7,792,025 B2 * | 9/2010 | Segel et al. | ................... | 370/230 |

(Continued)

FOREIGN PATENT DOCUMENTS

| | | |
|---|---|---|
| CN | 1751303 A | 3/2006 |
| CN | 1949812 A | 4/2007 |

(Continued)

OTHER PUBLICATIONS

Communication in European Application No. 08784085.6-2416, mailed Apr. 29, 2010.

(Continued)

*Primary Examiner* — Jeffrey R Swearingen
(74) *Attorney, Agent, or Firm* — Leydig, Voit & Mayer, Ltd.

(57) ABSTRACT

A multicast/unicast admission control method, a multicast/unicast admission control device, and a multicast/unicast admission control system are provided. In the method, through centralized resource control of a resource and admission control subsystem (RACS), sharing of multicast/unicast resources is realized. The RACS allocates and authorizes resources to an access node (AN), the AN manages the obtained multicast resources under the authorization, and the resource allocation is adjusted through interaction when the multicast resources of the AN or the resources of the RACS are not sufficient.

12 Claims, 4 Drawing Sheets

(56) References Cited

U.S. PATENT DOCUMENTS

| | | | |
|---|---|---|---|
| 8,144,587 B2 * | 3/2012 | Heinz et al. | 370/235 |
| 2003/0135594 A1 | 7/2003 | Xu et al. | |
| 2007/0070890 A1 | 3/2007 | Rojahn | |
| 2007/0081459 A1 | 4/2007 | Segel et al. | |

FOREIGN PATENT DOCUMENTS

| | | | |
|---|---|---|---|
| CN | 1976444 A | | 6/2007 |
| CN | 101060473 A | | 10/2007 |
| EP | 1763273 A1 | | 3/2007 |
| EP | 1 802 046 A1 | | 6/2007 |
| JP | 2005124193 A | * | 5/2005 |
| JP | 2007324814 A | * | 12/2007 |
| JP | 2008199541 A | * | 8/2008 |
| JP | 2009027429 A | * | 2/2009 |
| KR | 2009003977 A | * | 1/2009 |
| WO | 2005/020520 A2 | | 3/2005 |

OTHER PUBLICATIONS

First Office Action in Chinese Application No. 200710145177.0, mailed Jun. 10, 2010.
Written Opinion in PCT Application No. PCT/CN2008/072094, mailed Nov. 20, 2008.
Ooghe, S., et al., "Framework and Requirements for an Access Node Control Mechanism in Broadband Multi-Service Networks draft-ietf-ancp-framework-02.txt," *Network Working Group*, Jul. 9, 2007.
$1^{st}$ Office Action in corresponding European Application No. 08784085.6 (May 5, 2011).
$2^{nd}$ Office Action in corresponding European Patent Application No. 08784085.6 (Jan. 10, 2012).

* cited by examiner

MULTICAST/UNICAST ADMISSION CONTROL METHOD, DEVICE AND SYSTEM

CROSS-REFERENCE TO RELATED APPLICATIONS

This application is a continuation of International Application No. PCT/CN2008/072094, filed on Aug. 21, 2008, which claims priority to Chinese Patent Application No. 200710145177.0, filed on Aug. 24, 2007, both of which are hereby incorporated by reference in their entireties.

FIELD OF THE TECHNOLOGY

The present invention relates to a multicast/unicast technology, and more particularly to a multicast/unicast admission control method, a multicast/unicast admission control device, and a multicast/unicast admission control system.

BACKGROUND OF THE INVENTION

The Internet Protocol Television (IPTV) video service is a high bandwidth service, which is required to have a low packet loss ratio due to the high requirements for the real time performance. However, the network bandwidth, especially user link bandwidth, is generally rather limited. Therefore, in order to ensure the effective implementation of the video service and guarantee the service quality, a resource and admission control subsystem (RACS) needs to be deployed in the network.

The IPTV service includes a multicast/broadcast video service (for example, Broadcast Television (BTV)) and a unicast video service (for example, Video on Demanding (VOD)). Since the multicast service mode is significantly different from the unicast service mode, Admission Control (AC) functions thereof are implemented in quite different ways.

Besides the unicast video service such as VOD, various unicast service flows also exist, including services that have certain requirements for resources such as bandwidth, priority, or quality of service (QoS), for example, video telephony, VOIP, and web conference. All the services require AC and QoS guarantee.

The multicast AC is generally realized in an Access Node (AN). Specifically, the AN determines whether the user link bandwidth or multicast bandwidth meets the bandwidth requirement of a request for joining a channel, or determines whether the number of channels which the user has joined exceeds an upper limit. If the user link bandwidth is insufficient or the number of channels which the user has joined exceeds the upper limit, it indicates that the AC requested by the user fails, and the AN rejects the channel join request from the user.

The unicast AC function is generally implemented by an independent RACS. The RACS knows about the network topology, and manages an end-to-end bandwidth from a unicast video server to a user. Therefore, when the user requests a unicast video service, the service server requests resources from the RACS, the RACS determines whether the end-to-end bandwidth meets the requirement, and returns a resource request result, and then the service server determines whether to admit the service according to the resource request result.

Based on the above multicast and unicast service modes, the multicast/unicast AC function requested by the user can be implemented through two solutions in the prior art.

In technical solution 1, on a user link, resources are respectively reserved for a multicast service and a unicast service, so that the resources reserved for the multicast service cannot be occupied by the unicast service and the resources reserved for the unicast service cannot be occupied by the multicast service. That is, the AN implements the local multicast AC function, and the RACS implements the end-to-end AC function from the unicast video server to the user. In this technical solution, the unicast AC function and the multicast AC function are independent from each other, and do not interfere with each other.

In technical solution 2, when the user requests to join a certain channel, the AN actively reports information about the channel which the user joins, and sends the information to the RACS directly or through a broadband network gateway (BNG). Then, the RACS determines whether the user link bandwidth meets the requirements, and if not, the RACS notifies the AN to reject the join request from the user. In this technical solution, the joining information of the multicast user is reported by the AN, and the AN does not have the multicast AC function, so that the RACS performs the AC operation uniformly, including both unicast and multicast.

During the implementation of the present invention, the inventor found that the prior art at least has the following problems.

For example, in the technical solution 1, the multicast service and the unicast service cannot share the bandwidth resources, which results in the waste of the bandwidth resources, and the technical solution 1 is merely applicable to scenarios where the user link bandwidth is sufficient.

In the technical solution 2, although the AN reports the joining information of the multicast user, and the RACS performs uniformly AC operation, and the multicast and the unicast are unified, this solution is rather complicated. Moreover, as a switching frequency of the multicast service is greater than that of the unicast service, a large amount of information exchange between AN and RACS may be caused when a large number of TV users frequently switch the channels, resulting in an extremely high requirement for the performance of the AN. Furthermore, the channel switching of the multicast service requires the AN to report the joining information of the multicast user and to interact with the RACS, so that the delay of the channel switching is quite long, and the user experience is rather poor, thereby reducing the utilization of the bandwidth resources.

SUMMARY OF THE INVENTION

Accordingly, the present invention is directed to a multicast admission control method, which can realize sharing and flexible allocation of multicast/unicast resources while reducing a delay of channel switching of a multicast service.

The present invention is also directed to a unicast admission control method, which can realize sharing and flexible allocation of multicast/unicast resources.

The present invention is further directed to a network device, which can realize sharing and flexible allocation of multicast/unicast resources while reducing a delay of channel switching of a multicast service.

The present invention is further directed to a multicast/unicast admission control system, which can realize sharing and flexible allocation of multicast/unicast resources while reducing a delay of channel switching of a multicast service.

In order to achieve the above objectives, the technical solutions of the present invention are specifically described as follows.

According to a first aspect of the invention the multicast admission control (AC) method is provided, which includes the following:

An AN receives an Internet Group Management Protocol (IGMP) join message, and sends a multicast resource request to an RACS.

The RACS receives the multicast resource request and performs a resource AC operation.

When it is determined that resources are sufficient, the RACS allocates multicast resources to the AN and authorizes the AN to manage the multicast resources, and then the AN sends a multicast service flow to a user equipment (UE) after obtaining the multicast resources.

The AN receives a multicast channel switching request message, and performs an AC operation according to the currently authorized and allocated multicast resources, and if the multicast resources are sufficient, the AN sends a multicast service flow to the UE.

According to a second aspect of the invention the unicast admission control (AC) method is provided, which includes the following:

An RACS receives a unicast service resource request message from an application function (AF), and performs a resource AC operation.

If resources are sufficient, a unicast service resource request success message is returned.

If the resources are insufficient, the RACS sends a multicast resource usage state check message or a multicast resource forced release message to an AN.

According to a returned multicast resource usage state check response message or multicast resource forced release response message, the AC operation is performed once again and a corresponding unicast service resource request response message is sent to the AF.

According to a third aspect of the invention the AN is provided, which includes a multicast control module, a processing module, and a resource admission interface module.

The multicast control module is adapted to perform a multicast service flow replication, and send a multicast service flow to a UE, or stop performing the multicast service flow replication to the UE.

The processing module is adapted to determine whether multicast resources currently authorized to be managed satisfy the requirement on resources required by a multicast channel switching request.

The resource admission interface module is adapted to perform message interaction between the processing module in the AN and an RACS.

Specifically, the multicast control module receives a multicast channel switching request or a channel join request sent by the UE and sends the multicast channel switching request or the channel join request to the processing module. The processing module receives the multicast channel switching request from the multicast control module, and determines whether the multicast resources currently authorized to be managed satisfy the requirement on resources required by the multicast channel switching request, and if yes, the processing module admits the multicast channel switching request and takes the currently authorized and allocated multicast resources as available resources for the multicast channel switching, and notifies the multicast control module to perform the multicast service flow replication to the UE.

According to a forth aspect of the invention the RACS is provided, which includes an AF interface module, an admission control module, and an AN interface module.

The AF interface module is adapted to transfer a unicast service resource request message and a unicast service resource request response message between an AF and the admission control module.

The AN interface module is adapted to transfer a multicast resource request message and a multicast resource request response message between the admission control module and an AN.

The admission control module is adapted to provide centralized and uniformly resource management, perform uniformly resource allocation in response to the multicast resource request from the AN and the unicast resource request from the AF, receive the unicast service resource request message from the AF interface module, perform a uniformly resource AC operation in response to the unicast service resource request, and admit the unicast resource request when it is determined that resources are sufficient, and send a unicast resource request success message through the AF interface module; or receive the multicast resource request message sent from the AN through the AN interface module, perform a uniformly AC operation in response to the multicast resource request, and admit the multicast resource request when it is determined that the resources are sufficient, authorize the AN to manage the obtained resources, and send a multicast resource request success message through the AN interface module.

According to a fifth aspect of the invention the multicast/unicast admission control system is provided, which includes an AF, an RACS, and an AN.

The AN is adapted to manage multicast resources allocated and authorized to the AN by the RACS according to an authorization from the RACS, receive a multicast channel switching request sent from a UE, determine whether the multicast resources currently authorized to be managed satisfy the requirement on resources required by the multicast channel switching request, and if yes, admit the multicast channel switching request; receive a multicast resource state query message sent from the RACS, and return a current usage situation of the multicast resources to the RACS.

The AF is adapted to receive a unicast service request sent from the UE, send a unicast service resource request required by the unicast service to the RACS; receive a unicast service resource request response message sent from the RACS, and send the unicast service to the UE or reject the unicast service request from the UE according to the response message.

The RACS is adapted to receive a multicast service resource request message from the AN, perform an AC operation, allocate resources to the AN for the multicast service when it is determined that the resources are sufficient, and authorize the AN to perform subsequent management on the allocated resources serving as available multicast resources; receive a unicast service resource request message sent from the AF, perform an AC operation, and send a unicast service resource request success message to the AF when it is determined that the resources are sufficient.

As compared with the prior art, in the multicast/unicast admission control method, the multicast/unicast admission control device, and the multicast/unicast admission control system of the present invention, through the centralized resource control and allocation of the RACS, sharing of multicast/unicast resources is realized. The RACS allocates resources to the AN according to the resource request from the AN and authorizes the AN to manage the obtained resources. The AN handles the multicast service according to the authorized multicast resources. When the AN receives a multicast channel switching resource request from the UE, the AN determines whether the currently authorized multicast resources satisfy the multicast channel switching resource request from the UE, and if yes, directly sends a multicast service flow to the UE, without exchanging information with the RACS, so as to save the time spent on exchanging information with the RACS during the channel switching, thereby realizing the fast channel switching.

In addition, the RACS receives the unicast service resource request from the AF, and when it is determined that the resources are insufficient, the RACS may admit the unicast service resource request by sending a multicast resource usage state check message or a multicast resource forced release message to the AN.

Meanwhile, through the centralized resource control of the RACS, flexible allocation of multicast/unicast resources is realized, thereby improving the utilization of network resources and realizing the sharing of multicast/unicast resources.

DETAILED DESCRIPTION OF THE EMBODIMENTS

To make the objectives, technical solutions, and advantages of the present invention more comprehensible, the present invention is described below through embodiments and the accompanying drawings.

In the present invention, through centralized resource control of an RACS, sharing and flexible allocation of multicast/unicast resources are realized. The resources include bandwidth, priority, or other attributes, as well as attribute combinations. For example, the most common resource is a bandwidth resource, or may be a bandwidth with a guaranteed priority in terms of attribute combinations. The RACS allocates resources according to a resource request from an AN and authorizes the AN to manage the resources. When the AN receives a multicast channel switching resource request from the UE, the AN determines whether the authorized and allocated multicast resources satisfy the requirement on resources required by the multicast channel switching request from the UE according to the authorized and allocated multicast resources, and if yes, the AN directly sends a multicast service flow to the UE; otherwise, the AN requests the resources required by the multicast channel switching from the RACS, and then the RACS receives the multicast channel switching resource request, and allocates resources to the AN for the multicast service. Meanwhile, the RACS directly processes a unicast service resource request. Thus, the RACS realizes the flexible resource allocation based on the centralized and uniformly control over the unicast service and the multicast service.

In order to achieve the above objectives, an embodiment of the present invention provides a multicast/unicast admission control system.

Figure 1A:
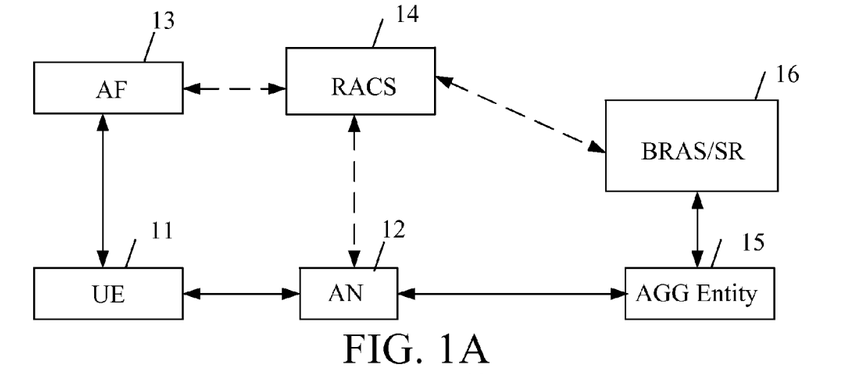
FIG. 1A is a schematic structural view of a multicast/unicast admission control system according to an embodiment of the present invention.

FIG. 1A is a schematic structural view of a multicast/unicast admission control system according to an embodiment of the present invention. Referring to FIG. 1A, the system includes a UE 11, an AN 12, an AF 13, an RACS 14, an aggregation (AGG) entity 15, and a broadband remote access server or a service router (BRAS/SR) 16. The UE 11 sends an Internet Group Management Protocol (IGMP) join message to the AN 12, and then the AN 12 sends a multicast resource request message to the RACS 14. The RACS 14 receives the multicast resource request message, performs a resource AC operation, and when it is determined that the resources are sufficient, the RACS 14 authorizes and allocates multicast resources to the AN 12, and then the AN 12 obtains the authorized and allocated multicast resources. The details will not be described herein again.

The UE 11 is adapted to send a multicast channel switching request message to the AN 12, send a unicast service request message to the AF 13, and receive a multicast service flow sent from the AN 12 and a unicast service flow sent from the AF 13.

The AN 12 is adapted to manage the multicast resources allocated by the RACS 14 according to an authorization from the RACS 14, receive the multicast channel switching request message sent from the UE 11, determine whether the currently authorized and allocated multicast resources satisfy the requirement on resources required by the multicast channel switching request, and if yes, admit the multicast channel switching request and send a multicast service flow to the UE; and receive a multicast resource usage state check message or a multicast resource forced release message sent from the RACS 14, and send a multicast resource usage state check response message or a multicast resource forced release response message.

The AF 13 is adapted to receive the unicast service request message sent from the UE 11, send a unicast service resource request message to the RACS 14; receive a unicast service resource request response message sent from the RACS 14, and send a unicast service flow or prompt information to the UE 11.

The RACS 14 is adapted to authorize and allocate the multicast resources to the AN, receive the unicast service resource request message sent from the AF 13, perform a resource AC operation, and when it is determined that the resources are insufficient, send the multicast resource usage state check message or multicast resource forced release message to the AN 12, and admit or reject the unicast resource request according to the returned multicast resource usage state check response message or multicast resource forced release response message, and send a unicast resource request response message to the AF 13.

The AGG entity 15 is adapted to collect the network topology, and is an upper-level entity of the AN 12.

The BRAS/SR 16 is adapted to manage the UE 11.

Figure 1B:
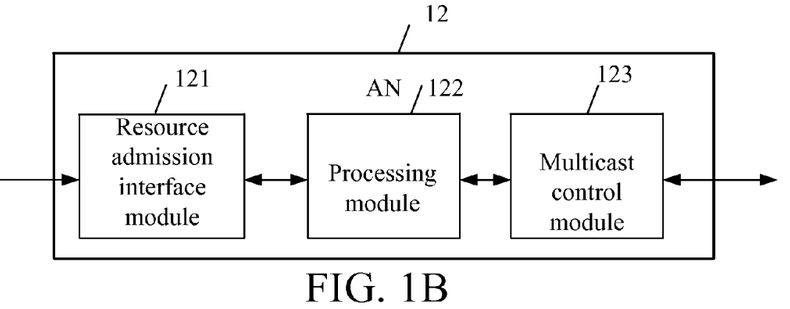
FIG. 1B is a schematic structural view of an AN according to an embodiment of the present invention.

FIG. 1B is a schematic structural view of an AN according to an embodiment of the present invention. Referring to FIG. 1B, the AN 12 includes a resource admission interface module 121, a processing module 122, and a multicast control module 123.

The resource admission interface module 121 receives a multicast resource request from the processing module 122, sends a multicast resource request message to the RACS 14; receives a multicast resource request response message sent from the RACS 14, and forwards the multicast resource request response message to the processing module 122.

The processing module 122 receives a multicast channel switching request sent from the multicast control module 123, and determines whether the currently authorized and allocated multicast resources satisfy the requirement on resources required by the multicast channel switching request, and if yes, the processing module 122 admits the multicast channel switching request, takes the currently authorized and allocated multicast resources as resources for the multicast channel switching, and sends the resources to the multicast control module 123; otherwise, the processing module 122 sends a multicast resource request message to the resource admission interface module 121, and receives a multicast resource request response message sent from the resource admission interface module 121. If the response message contains acknowledgement information, the processing module 122 admits the multicast channel switching request, updates the currently authorized and allocated multicast resources, takes the updated multicast resources as resources for the multicast channel switching, and sends the resources to the multicast control module 123; and if the response message does not contain the acknowledgement information, the processing module 122 sends a multicast channel switching request reject message to the multicast control module 123.

The multicast control module 123 is adapted to receive a multicast channel switching request message sent from the UE 11, send the multicast channel switching request message to the processing module 122; receive multicast channel resources from the processing module 122, and send a multicast service flow to the UE.

In practical application, the processing module 122 may be further adapted to receive a multicast resource usage state check message or a multicast resource forced release message sent from the resource admission interface module 121, and send a corresponding response message to the RACS 14.

The resource admission interface module 121 receives the multicast resource usage state check message or the multicast resource forced release message sent from the RACS 14, and sends the multicast resource usage state check message or the multicast resource forced release message to the processing module 122.

The resource admission interface module 121 receives a multicast resource usage state check response message or a multicast resource forced release response message sent from the processing module 122, and sends the multicast resource usage state check response message or the multicast resource forced release response message to the RACS 14.

Figure 1C:
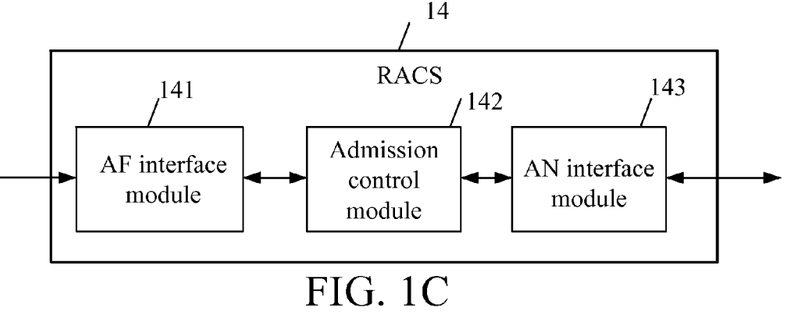
FIG. 1C is a schematic structural view of an RACS according to an embodiment of the present invention.

FIG. 1C is a schematic structural view of an RACS 14 according to an embodiment of the present invention. Referring to FIG. 1C, the RACS 14 includes an AF interface module 141, an admission control module 142, and an AN interface module 143.

The AF interface module 141 is adapted to receive a unicast service resource request message from the UE 11, send the unicast service resource request message to the admission control module 142, and send a unicast service resource request response message from the admission control module 142 to the AF 13.

The admission control module 142 is adapted to receive a message sent from the AF interface module 141. If the message is a unicast service resource request message, the admission control module 142 performs an AC operation, and sends a multicast resource check request message or a multicast forced release request message to the AN interface module 143 when it is determined that the resources are insufficient. If the message is a multicast resource usage state check acknowledgement message or a multicast resource forced release acknowledgement message, the admission control module 142 performs an AC operation after the AN releases the multicast resources to the admission control module 142 in the RACS 14, and if the unicast service resource request is successfully admitted, the admission control module 142 sends a unicast service resource request success message to the AF interface module 141.

The AN interface module 143 is adapted to receive a multicast resource request message from the AN, and send the multicast resource request message to the admission control module 142; receive a multicast resource request response message sent from the admission control module 142, and send the multicast resource request response message to the AN 12.

Referring to FIGS. 1-1c, the following two embodiments are provided to further illustrate the specific implementation of the present invention in the multicast/unicast admission control system.

First Embodiment

Figure 2A:
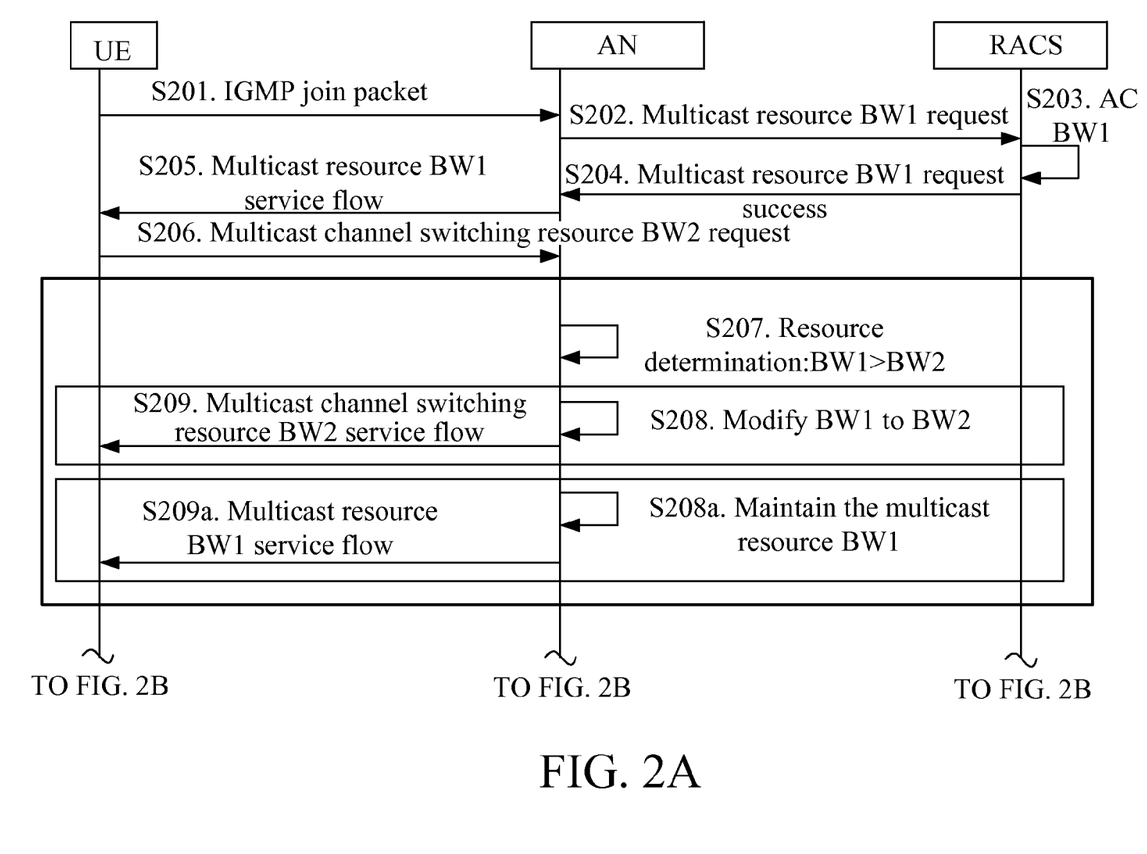
FIGS. 2A-2B is a schematic flow chart of a multicast admission control method according to a first embodiment of the present invention.
Figure 2B:
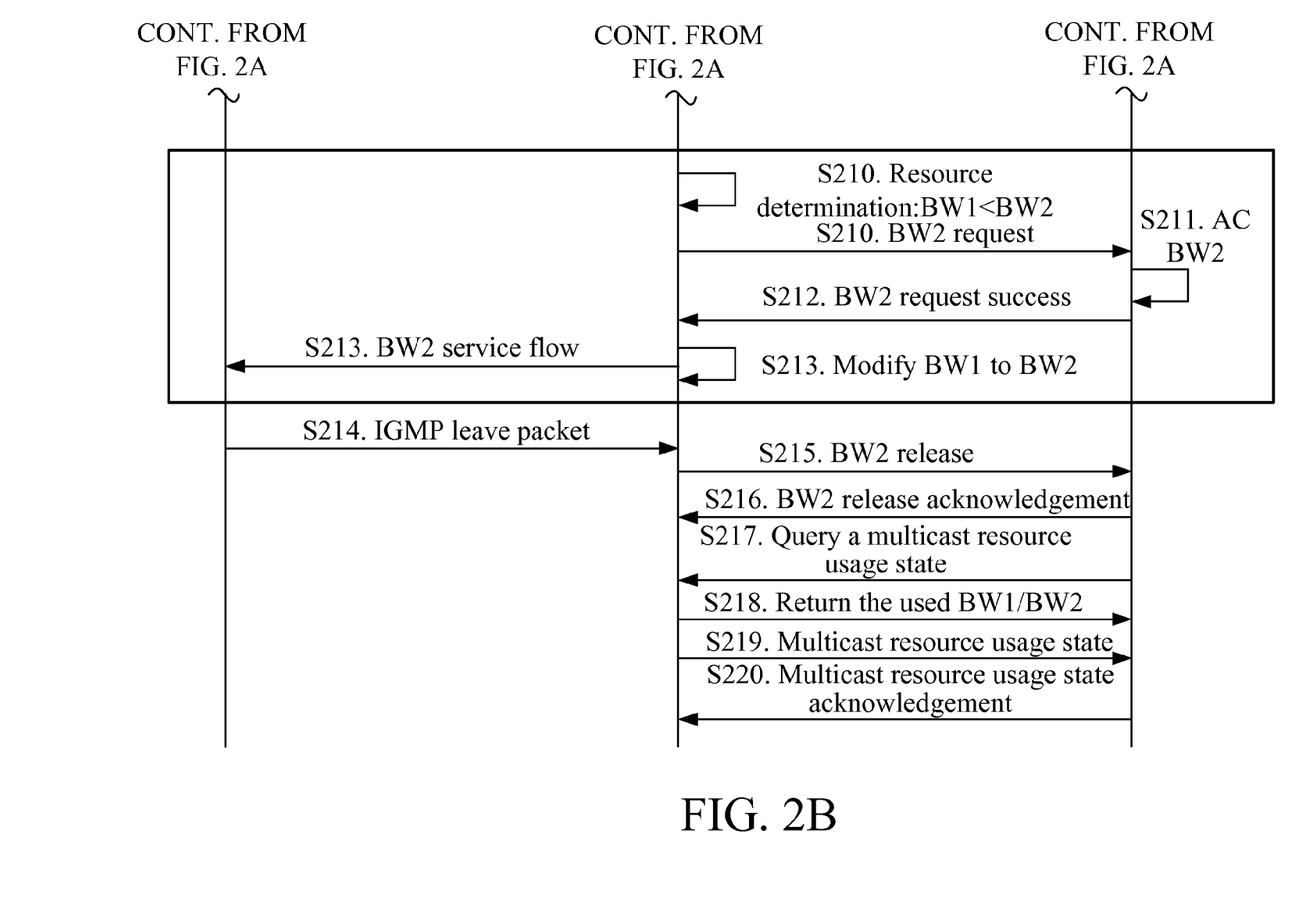

FIG. 2 is a schematic flow chart of a multicast admission control method according to a first embodiment of the present invention. Referring to FIG. 2, the method includes the following steps.

In Step S201, a UE sends an IGMP join message carrying a required multicast resource BW1 request to an AN.

In Step S202, the AN receives the multicast resource BW1 request and sends the multicast resource BW1 request to an RACS.

In Step S203, the RACS receives the multicast resource BW1 request and performs an AC operation for the multicast resource BW1.

In Step S204, after the AC is successful, the RACS sends a multicast resource BW1 request acknowledgement message to the AN.

In this step, the RACS sends the multicast resource BW1 request acknowledgement message to the AN, and authorizes the AN to manage the multicast resource BW1, which is provided for the AN to independently manage the subsequent multicast resource requests. For example, one entity in the AN manages one request from one UE, and the RACS performs centralized control, such that uniformly resource management and flexible resource allocation are realized through the interaction between the RACS and the AN.

In practical application, the RACS may also allocate certain multicast resource BW1 to the AN and authorizes the AN to manage the multicast resource BW1 in advance, before the UE sends the IGMP join message.

In Step S205, the AN uses the multicast resource BW1 to send a multicast service flow to the UE.

In Step S206, the UE switches the channel, and sends a multicast channel switching request message to the AN.

In practical application, the channel switching process generally involves an IGMP leave message and an IGMP join message in pair that are sequentially processed in a short time interval. The sequence that the leave message is processed earlier than the join message and the short time interval between the leave message and the join message are distinct differences between the channel switching operation and a single IGMP join message generated when a multicast service is initially used or a single IGMP leave message generated when the multicast service is terminated.

In Step S207, the AN receives a multicast channel switching request message, and determines whether the currently authorized and allocated multicast resource BW1 satisfies a resource BW2 required by the multicast channel switching request, and if yes, Step S208 is performed; otherwise, Step S210 is performed.

Alternatively, in this step, the AN receives the multicast channel switching request message and determines whether the currently authorized and allocated multicast resource satisfies the resource, that is, the multicast resource BW2 required by the multicast channel switching request according to the currently authorized and allocated multicast resource. For example, if BW1>BW2, that is, the currently authorized and allocated multicast resource BW1 satisfies the resource BW2 required by the multicast channel switching request, the currently authorized and allocated multicast resource BW1 retains unchanged, and then the AN sends the multicast resource BW1 to the UE, that is, Steps S208a-S209a are performed. As such, when the UE switches the channel frequently, the maximum resource is reserved, thereby effectively solving the problem of multicast delay caused by requesting multicast resources from the RACS and performing the AC operation when the currently authorized and allocated multicast resources are insufficient during the channel switching.

In Step S208, the AN modifies the multicast resource BW1 to BW2.

In Step S209, the AN utilizes the multicast resource BW2 to send a multicast service flow to the UE.

In Step S208a, the AN maintains the multicast resource BW1.

In Step S209a, the AN utilizes the multicast resource BW1 to send a multicast service flow to the UE.

In Step S210, the AN requests the multicast resource BW2 from the RACS.

In Step S211, the RACS receives a multicast resource BW2 request message, and performs an AC operation for the multicast resource BW2.

In this step, if the resources managed by the RACS cannot satisfy the requirement on the multicast resource BW2, the AC fails, and the RACS sends a multicast resource BW2 reject message to the AN, and the AN receives the multicast resource BW2 reject message, and rejects the multicast channel switching request from the UE.

In Step S212, after the AC is successful, the RACS sends a multicast resource BW2 request success message to the AN.

In Step S213, the AN modifies the multicast resource BW1 to the multicast resource BW2, and utilizes the resource BW2 to send a multicast service flow to the UE.

In Step S214, the UE terminates the multicast service, and sends an IGMP leave message to the AN.

In Step S215, the AN sends a multicast resource BW2 release message to the RACS.

In this step, if the UE does not perform the channel switching, that is, the AN sends the service flow to the UE through the multicast resource BW1, or if the UE performs the channel switching, but the AN sends the service flow to the UE through the multicast resource BW1, the AN sends a multicast resource BW1 release message to the RACS.

In Step S216, the RACS sends a multicast resource BW2 release acknowledgement message to the AN.

If the AN sends the multicast resource BW1 release message to the RACS in Step S215, the RACS sends a multicast resource BW1 release acknowledgement message to the AN in this step.

In practical application, the RACS may also periodically or non-periodically query the AN for a multicast resource usage state, so as to obtain a usage situation of the multicast resources used by the AN, and in this case, Steps S217 and S218 may be performed.

In Step S217, the RACS periodically or non-periodically queries the AN for the multicast resource usage state.

In Step S218, the AN returns the used multicast resource BW1/BW2 to the RACS.

In practical application, the AN may also periodically or non-periodically report the multicast resource usage state to the RACS actively, and in this case, Steps S219 and S220 may be performed.

In Step S219, the AN periodically or non-periodically reports the multicast resource usage state to the RACS actively.

In Step S220, the RACS returns a multicast resource usage state acknowledgement message to the AN.

Second Embodiment

In the first embodiment, the RACS authorizes the AN and allocates multicast resources to the AN according to a local policy, and enables the AN to independently manage the multicast resources. If the multicast resources managed by the AN cannot meet the resource requirements of multicast channel switching requested by the UE, the AN interacts with the RACS to request resources required by the multicast channel switching for the UE. In practical application, for a unicast service request from the UE, the AF may also request resources required by the unicast service from the RACS in a similar way.

Figure 3:
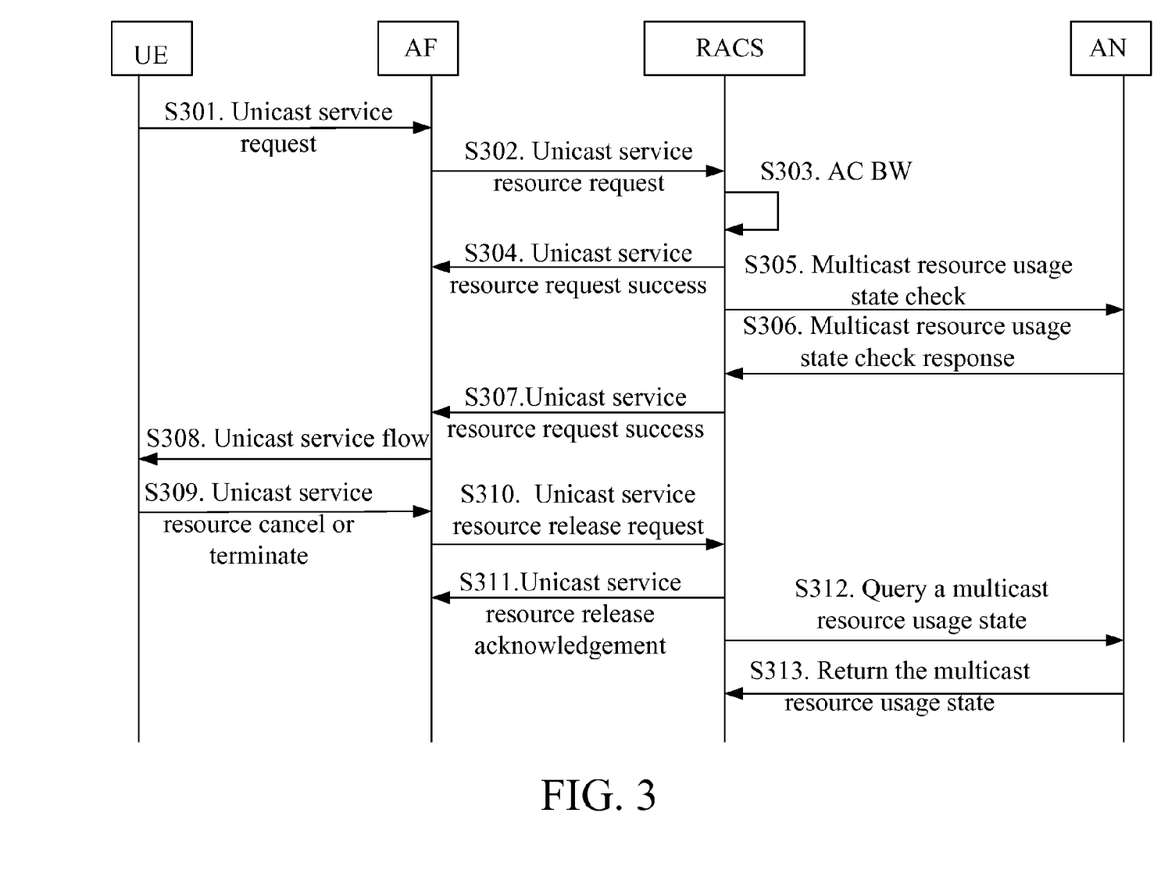
FIG. 3 is a schematic flow chart of a unicast admission control method according to a second embodiment of the present invention.

FIG. 3 is a schematic flow chart of a unicast admission control method according to a second embodiment of the present invention. Referring to FIG. 3, the method includes the following steps.

In Step S301, a UE sends a unicast service request message to an AF.

In Step S302, the AF receives the unicast service request, and sends a unicast service resource request message to an RACS.

In Step S303, the RACS receives the unicast service resource request message, and performs an AC operation in response to the unicast resource request.

In Step S304, after the AC is successful, the RACS sends a unicast service resource request success message to the AF.

In this step, if the resources managed by the RACS can meet the requirement on resources required by the unicast service resource request from the UE, the AC is successful, and a unicast service resource request acknowledgment message is sent to the AF, and Step S308 is performed; otherwise, Step S305 is performed.

In Step S305, the RACS sends a multicast resource usage state check message to the AN, so as to check the consistency between the multicast resource usage state in the AN and that in the RACS.

In this step, if the priority of a multicast service is set to be lower than that of a unicast service, when the resources are insufficient, the unicast service resource request may trigger the RACS to release the multicast resources used by the AN in a forced manner. In this case, this step becomes Step S305a, in which the RACS sends a multicast resource forced release message to the AN, and forces the AN to release the occupied multicast resources, and meanwhile the RACS cancels the multicast resource management right authorized to the AN, and the multicast resources are returned to the RACS for allocation.

In Step S306, the AN receives the multicast resource usage state check message, and returns a multicast resource usage state check response message to the RACS.

In this step, if the condition is the same as that in Step S305, that is, the priority of a multicast service is set to be lower than that of a unicast service, when the resources are insufficient, the unicast service resource request may trigger the RACS to release the multicast resources used by the AN in a forced manner. In this case, this step becomes Step S306a, in which the AN receives the multicast resource forced release message, and returns a multicast resource forced release success message to the RACS, and returns the multicast resources to the RACS for allocation.

In Step S307, the RACS sends a unicast service resource request success message to the AF.

In Step S308, the AF receives the unicast service resource request success message, and sends a unicast service flow to the UE.

In Step S309, the UE sends a unicast service resource cancel or terminate message to the AF.

In Step S310, the AF sends a unicast service resource release request message to the RACS.

In Step S311, the RACS receives the unicast service resource release request message, releases the unicast service resources, and returns a unicast service resource release acknowledgement message to the AF.

In Step S312, the RACS periodically or non-periodically queries the AN for a multicast resource usage state.

In Step S313, the AN returns the multicast resource usage state to the RACS.

Although the objectives, technical solutions, and advantages of the present invention are further described in detail through the above preferred embodiments, it should be understood that the above descriptions are merely preferred embodiments of the present invention, but not intended to limit the present invention, and any modification, equivalent replacement, or improvement made without departing from the spirit and principle of the present invention shall fall within the scope of the present invention.

What is claimed is:

1. A multicast admission control (AC) method, comprising:
   receiving, by an access node (AN) in a first device, an Internet Group Management Protocol (IGMP) join message, and sending a multicast resource request to a resource and admission control subsystem (RACS) in a second device;
   receiving, by the RACS, the multicast resource request, and performing a resource AC operation;
   allocating, by the RACS, multicast resources to the AN and authorizing the AN to manage the multicast resources when it is determined that resources are sufficient, and sending, by the AN, a multicast service flow to a user equipment (UE) after obtaining the multicast resources, wherein the multicast resources are bandwidth resources for the multicast service, or a bandwidth with a guaranteed priority for the multicast service; and
   receiving, by the AN, a multicast channel switching request message, and performing an AC operation according to the currently authorized and allocated multicast resources, and sending, by the AN, a multicast service flow to the UE if the multicast resources are sufficient for sending the multicast service flow.

2. The method according to claim 1, further comprising: requesting, by the AN, resources required by the multicast channel switching from the RACS, if the multicast resources currently authorized to be managed cannot meet the requirement on the resources required by the multicast channel switching request; performing, by the RACS, an AC operation and returning a resource request response message; and updating, by the AN, the multicast resources authorized to be managed as newly obtained resources if the resource request is successful, and admitting the multicast channel switching request.

3. The method according to claim 1, further comprising: receiving, by the AN, an IGMP leave message, and sending a multicast resource release message to the RACS; receiving, by the AN, a multicast resource release acknowledgement message returned by the RACS, and releasing the multicast resources.

4. The method according to claim 1, further comprising: receiving, by the AN, periodically or non-periodically a multicast resource usage state query message sent from the RACS, and returning a multicast resource usage state query response message to the RACS.

5. The method according to claim 1, wherein the admitting the multicast channel switching request comprises: taking, by the AN, the currently authorized and allocated multicast resources as available resources for the multicast channel switching request.

6. The method according to claim 1, wherein if the multicast resources are sufficient for sending the multicast service flow, the currently authorized and allocated multicast resources remain unchanged.

7. The method according to claim 1, wherein if the multicast resources are sufficient for sending the multicast service flow, modifying, by the AN, the currently authorized and allocated multicast resources to multicast resources required by the multicast channel switching request message.

8. A unicast admission control (AC) method, comprising:
   receiving, by a resource and admission control subsystem (RACS) in a first device, a unicast service resource request message from an application function (AF), and performing a resource AC operation;
   returning a unicast service resource request success message, if resources are sufficient;
   sending, by the RACS, a multicast resource forced release message to an access node (AN) in a second device to force the AN to release occupied multicast resources, if the resources are insufficient and a priority of a multicast service is lower than a priority of a unicast service;
   canceling, by the RACS, multicast resources authorized to the AN, and the multicast resources authorized to the AN are returned to the RACS; and
   performing, by the RACS, the AC operation once again according to the returned resources, and sending a corresponding unicast service resource request response message to the AF.

9. The method according to claim 8, further comprising: receiving, by the RACS, a unicast service cancel or terminate message sent from the AF, and releasing unicast resources.

10. The method according to claim 8, further comprising:
    receiving, by the AN, an Internet Group Management Protocol (IGMP) join message, and sending a multicast resource request to the RACS;
    receiving, by the RACS, the multicast resource request, and performing the resource AC operation;
    allocating, by the RACS, new multicast resources to the AN and authorizing the AN to manage the new multicast resources when it is determined that the resources are sufficient, and sending, by the AN, a multicast service flow to a user equipment (UE) after obtaining the new multicast resources, wherein the new multicast resources are bandwidth resources for the multicast service, or a bandwidth with a guaranteed priority for the multicast service, wherein the multicast resources authorized and allocated to the AN include the new multicast resources; and
    receiving, by the AN, a multicast channel switching request message, and performing the AC operation according to the multicast resources that currently authorized and allocated to the AN, and sending, by the AN, a multicast service flow to the UE if the multicast resources that currently authorized and allocated to the AN are sufficient for sending the multicast service flow.

11. A unicast admission control (AC) system, comprising: an application function (AF), a first device comprising a resource and admission control subsystem (RACS), and a second device comprising an access node (AN); wherein, the RACS is configured to receive a unicast service resource request message from the AF, perform a resource AC operation, and return a unicast service resource request success message, if resources are sufficient;

the RACS is further configured to allocate the resources according to a resource request from the AN and authorizes the AN to manage the resources;

the RACS is further configured to send a multicast resource forced release message to the AN to release occupied multicast resources, if the resources are insufficient and a priority of a multicast service is lower than a priority of a unicast service, cancel a multicast resource management right authorized to the AN, and the multicast resources authorized to the AN are returned to the RACS, and perform the AC operation once again according to the returned resources, and sending a corresponding unicast service resource request response message to the AF.

12. The system according to claim 11, wherein, the AN is configured to receive an Internet Group Management Protocol (IGMP) join message, and send a multicast resource request to the RACS;

the RACS is further configured to receive the multicast resource request, and perform the resource AC operation;

the RACS is further configured to allocate new multicast resources to the AN and authorize the AN to manage the new multicast resources when it is determined that the resources are sufficient;

the AN is further configured to send a multicast service flow to a user equipment (UE) after obtaining the new multicast resources, wherein the new multicast resources are bandwidth resources for the multicast service, or a bandwidth with a guaranteed priority for the multicast service, wherein multicast resources that currently authorized and allocated to the AN includes the new multicast resources; and the AN is further configured to receive a multicast channel switching request message, and perform the AC operation according to the multicast resources that currently authorized and allocated to the AN, and send a multicast service flow to the UE if the multicast resources that currently authorized and allocated to the AN are sufficient for sending the multicast service flow.

* * * * *

UNITED STATES PATENT AND TRADEMARK OFFICE
CERTIFICATE OF CORRECTION

| | | |
|---|---|---|
| PATENT NO. | : 8,930,451 B2 | Page 1 of 1 |
| APPLICATION NO. | : 12/685373 | |
| DATED | : January 6, 2015 | |
| INVENTOR(S) | : Gu et al. | |

It is certified that error appears in the above-identified patent and that said Letters Patent is hereby corrected as shown below:

Title Page, Assignee, "Huawei Technology Co., Ltd." should read -- Huawei Technologies Co., Ltd. --.

Signed and Sealed this
Second Day of June, 2015

Michelle K. Lee
*Director of the United States Patent and Trademark Office*